UNITED STATES PATENT OFFICE.

ALFRED PARAF, OF NEW YORK, N. Y., ASSIGNOR TO EDWARD SABINE RENWICK, TRUSTEE, OF SAME PLACE.

IMPROVEMENT IN PRODUCTS FROM MADDER.

Specification forming part of Letters Patent No. 113,918, dated April 18, 1871.

*To all whom it may concern:*

Be it known that I, ALFRED PARAF, of France, now residing in the city, county, and State of New York, have made an invention or discovery of a new and useful article of manufacture or composition of madder, which I denominate "Oil-Izarine;" and that the following is a full, clear, and exact description and specification of the same.

My invention consists of a new preparation of madder, produced by treating garancine with a hydrocarbon, such as kerosene, and consisting of a solution of the coloring-matter of madder compounded within insoluble matter.

The mode of producing said article, which I have practiced with success, is to boil one part, by weight, of dry garancine with six parts, by weight, of kerosene for three-quarters of an hour, the mixture being continually stirred. The product is then permitted to settle and the liquid portion is dipped out of the kettle.

The material in the kettle is boiled a second time for half an hour with the same quantity of kerosene. The product is permitted to settle and the liquid is dipped out of the kettle.

The material in the kettle is boiled a third time with the same quantity of kerosene. The product is permitted to settle and the liquid is dipped out of the kettle. The dregs remaining in the kettle are placed in bags and pressed to free them more thoroughly of the kerosene solution.

The article remaining in the bags is the new article of manufacture, denominated by me "oil-izarine," and may be used for such purposes as it may be found useful for, one of such purposes being the dyeing of cotton cloths.

In using oil-izarine for dyeing cotton cloths it is employed as a substitute for madder and its derivatives, and is treated in the same manner as madder and garancine are treated for the same purpose, the first step being to neutralize any free acid which is contained in the article by mixing powdered chalk with it, in the same way as powdered chalk is mixed with garancine for the same purpose. Oil-izarine, however, possesses advantages over madder and garancine, because the goods to be dyed may be placed directly in the boiling liquor in the dye-vat, and because a much less time is required to effect the process.

The mode which has above been described of manufacturing oil-izarine is the one which is preferred, because it enables a large amount of the coloring-matter of the madder to be removed from the garancine by the action of the solvent, which coloring-matter is valuable in its separated condition; but the invention is not limited to that process; nor is the invention restricted to the treatment of the garancine by kerosene, as some other hydrocarbon producing substantially the same effect upon the coloring-matter of the madder as kerosene may be used in its place.

I claim as the invention to be secured by Letters Patent—

The new article of manufacture denominated " oil-izarine," and hereinbefore described.

In witness whereof I hereto set my hand this 14th day of January, A. D. 1870.

ALFRED PARAF.

Witnesses:
W. C. WITTER,
C. G. EVANS.